US011511748B2

(12) United States Patent
Liu et al.

(10) Patent No.: US 11,511,748 B2
(45) Date of Patent: Nov. 29, 2022

(54) VELOCITY TRAJECTORY GENERATION METHOD, APPARATUS, AND STORAGE MEDIUM

(71) Applicant: Baidu Online Network Technology (Beijing) Co., Ltd., Beijing (CN)

(72) Inventors: Changchun Liu, Beijing (CN); Yaqin Chen, Beijing (CN); Peng Geng, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 284 days.

(21) Appl. No.: 16/789,212

(22) Filed: Feb. 12, 2020

(65) Prior Publication Data
US 2020/0262429 A1 Aug. 20, 2020

(30) Foreign Application Priority Data
Feb. 19, 2019 (CN) .......................... 201910121664.6

(51) Int. Cl.
*B60W 30/18* (2012.01)
*B60W 10/04* (2006.01)
(52) U.S. Cl.
CPC ............ *B60W 30/18* (2013.01); *B60W 10/04* (2013.01); *B60W 2720/106* (2013.01)
(58) Field of Classification Search
CPC ................ B60W 30/18; B60W 10/04; B60W 2720/106; B60W 60/0011; B60W 60/0021; G05D 2201/0213; G05D 1/0223
(Continued)

(56) References Cited

U.S. PATENT DOCUMENTS

| 2014/0207364 A1* | 7/2014 | Eidehall | B60W 30/0953 701/301 |
| 2016/0200317 A1* | 7/2016 | Danzl | B60W 10/04 701/25 |

(Continued)

FOREIGN PATENT DOCUMENTS

| CN | 1122290 A | 5/1996 |
| CN | 106114507 A | 11/2016 |

(Continued)

OTHER PUBLICATIONS

First Office Action issued by the China National Intellectual Property Administration in Chinese Patent Application No. 2019101216646, dated Jul. 5, 2021 (12 pages).

(Continued)

*Primary Examiner* — Jonathan M Dager
*Assistant Examiner* — Jean W Charleston
(74) *Attorney, Agent, or Firm* — Benesch, Friedlander, Coplan & Aronoff LLP (57) ABSTRACT

A velocity trajectory generation method and apparatus, and a storage medium are provided. The method includes: setting starting point time, intermediate point time and terminal point time of a velocity trajectory to be generated, wherein the velocity trajectory includes a first velocity sub-trajectory and a second velocity sub-trajectory; generating multiple first velocity sub-trajectories corresponding to a starting point velocity between the starting point time and the intermediate point time, according to the starting point velocity and multiple intermediate point velocities; and generating, for each of the first velocity sub-trajectories, multiple second velocity sub-trajectories between the intermediate point time and the terminal point time according to multiple terminal point velocities. A velocity trajectory which is more in line with a human driving characteristic (Continued)

may be generated, the comfort level of a passenger may be improved, and an algorithm may be simplified.

19 Claims, 8 Drawing Sheets

(58) Field of Classification Search
USPC .......................................................... 701/70
See application file for complete search history.

(56) References Cited

U.S. PATENT DOCUMENTS

| | | | | |
|---|---|---|---|---|
| 2017/0090478 | A1* | 3/2017 | Blayvas | G06Q 10/04 |
| 2017/0277192 | A1* | 9/2017 | Gupta | B60W 30/20 |
| 2018/0129203 | A1* | 5/2018 | Tafti | G05D 1/0217 |
| 2018/0299898 | A1* | 10/2018 | Luo | B60W 30/143 |
| 2019/0079514 | A1* | 3/2019 | Zhu | G01C 21/00 |
| 2019/0196485 | A1* | 6/2019 | Li | G01C 21/3407 |
| 2019/0243370 | A1* | 8/2019 | Li | B60W 30/08 |
| 2019/0317511 | A1* | 10/2019 | Xu | B60W 30/09 |
| 2021/0070295 | A1* | 3/2021 | Zhu | B60W 50/087 |
| 2021/0179140 | A1* | 6/2021 | Zhu | G08G 1/096775 |
| 2021/0181756 | A1* | 6/2021 | Zhu | G05D 1/0212 |

FOREIGN PATENT DOCUMENTS

| | | |
|---|---|---|
| CN | 106227204 A | 12/2016 |
| CN | 106325294 A | 1/2017 |
| CN | 107390634 A | 11/2017 |
| CN | 107618504 A | 1/2018 |
| CN | 108388272 A | 8/2018 |
| CN | 108594812 A | 9/2018 |
| CN | 108780610 A | 11/2018 |
| CN | 108981722 A | 12/2018 |
| CN | 109059944 A | 12/2018 |
| EP | 2620824 A1 | 7/2013 |
| JP | 2015058890 A * | 3/2015 |
| JP | 2015058890 A | 3/2015 |
| JP | 2018-062261 A | 4/2018 |
| KR | 20040060825 A | 7/2004 |

OTHER PUBLICATIONS

Search Report issued by the China National Intellectual Property Administration in Chinese Patent Application No. 2019101216646, dated Jun. 25, 2021 (6 pages).

Notification of Reason for Refusal issued by the Korean Patent Office in Korean Patent Application No. 10-2020-0019617, dated Feb. 18, 2020 (9 pages).

Extended European Search Report in European Patent Application No. 20158038.8, dated Jun. 22, 2020 (8 pages).

Kim, Jae-Hwan et al., "Threat Prediction Algorithm based on Local Path Candidates and Surrounding Vehicle Trajectory Predictions for Automated Driving /vehicles," 2015 IEEE Intelligent Vehicles Symposium (IV), IEEE, Jun. 28, 2015, pp. 1220-1225, XP033209879, DOI: 10.1109/IVS.2015.7225849 (6 pages).

Notice of Reasons for Refusal issued by the Japanese Patent Office in Japanese Patent Application No. 2020-024239, dated Mar. 4, 2021 (10 pages).

* cited by examiner

วELOCITY TRAJECTORY GENERATION METHOD, APPARATUS, AND STORAGE MEDIUM

CROSS-REFERENCE TO RELATED APPLICATION

This application claims priority to Chinese patent application No. 201910121664.6, filed on Feb. 19, 2019, which is hereby incorporated by reference in its entirety.

TECHNICAL FIELD

The present application relates to a field of driverless driving technology, and in particular, to a velocity trajectory generation method, apparatus, and a storage medium.

BACKGROUND

The core of trajectory planning for a driverless vehicle includes a velocity planning. At present, a common velocity planning method is to divide a velocity-time space into grids, plan multiple trajectories in each grid, connect the trajectories in multiple grids to obtain a large number of velocity trajectories, and then determine an optimal velocity trajectory therefrom. However, many of these velocity trajectories may not match an actual driving scene or be greatly different from an expectation, which may cause data redundancy and also increase a calculation amount of a subsequent optimum selection algorithm.

SUMMARY

A velocity trajectory generation method and apparatus, and a storage medium are provided according to embodiments of the application, to solve one or more technical problems in the existing technology.

In a first aspect, a velocity trajectory generation method is provided according to an embodiment of the application. The method includes:

setting starting point time, intermediate point time and terminal point time of a velocity trajectory to be generated, wherein the velocity trajectory comprises a first velocity sub-trajectory and a second velocity sub-trajectory;

generating multiple first velocity sub-trajectories corresponding to a starting point velocity between the starting point time and the intermediate point time, according to the starting point velocity and multiple intermediate point velocities; and generating, for each of the first velocity sub-trajectories, multiple second velocity sub-trajectories between the intermediate point time and the terminal point time according to multiple terminal point velocities.

In an implementation, the method in the embodiment of the application further includes:

generating the multiple intermediate point velocities, according to the starting point velocity, a time difference between the starting point time and the intermediate point time, and an acceleration threshold.

In an implementation, the generating the multiple intermediate point velocities, according to the starting point velocity, a time difference between the starting point time and the intermediate point time, and an acceleration threshold includes:

determining a maximum of the intermediate point velocity according to the starting point velocity and a maximum of the acceleration threshold;

determining a minimum of the intermediate point velocity according to the starting point velocity and a minimum of the acceleration threshold; and determining multiple intermediate point velocities between the maximum of the intermediate point velocity and the minimum of the intermediate point velocity at a preset sampling velocity interval.

In an implementation, the generating the first velocity sub-trajectory includes:

generating an Mth-order polynomial function of velocity and time, M being a positive integer greater than 1;

generating multiple sampling points between the starting point time and the intermediate point time at a preset sampling time interval according to the Mth-order polynomial function; and fitting the multiple sampling points, to obtain a curve representing the first velocity sub-trajectory.

In an implementation, the generating an Mth-order polynomial function of velocity and time includes:

determining a coefficient of each order of the Mth-order polynomial function according to the starting point time, the starting point velocity, a starting point acceleration, the intermediate point time, the intermediate point velocity, an intermediate point acceleration and an intermediate point acceleration jerk, wherein M is equal to 5.

In an implementation, the method in the embodiment of the application further includes:

generating multiple terminal point velocities according to the intermediate point velocity, a time difference between the intermediate point time and the terminal point time, and an acceleration threshold.

In an implementation, the generating multiple terminal point velocities according to a time difference between the intermediate point time and the terminal point time, and an acceleration threshold includes:

determining a maximum of the terminal point velocity according to the intermediate point velocity and a maximum of the acceleration threshold;

determining a minimum of the terminal point velocity according to the intermediate point velocity and a minimum of the acceleration threshold; and determining the multiple terminal point velocities between the maximum of the terminal point velocity and the minimum of the terminal point velocity at a preset sampling velocity interval.

In an implementation, the generating the second sub velocity trajectory includes:

generating an Nth-order polynomial function of velocity and time, N being a positive integer greater than 1;

generating multiple sampling points between the intermediate point time and the terminal point time at a preset time interval according to the Nth-order polynomial function; and fitting the multiple sampling points, to obtain a curve representing the second velocity sub-trajectory.

In an implementation, the generating an Nth-order polynomial function of velocity and time includes:

determining a coefficient of each order of the Nth-order polynomial function according to the intermediate point time, the intermediate point velocity, an intermediate point acceleration, the terminal point time, the terminal point velocity, a terminal point acceleration and a terminal point acceleration jerk, wherein N is equal to 5.

In an implementation, an acceleration jerk of each of the first velocity sub-trajectories is continuously changed, and an acceleration jerk of each of the second velocity sub-trajectories is continuously changed.

In a second aspect, a velocity trajectory generation apparatus is provided according to an embodiment of the application. The apparatus includes:

a setting module configured to set starting point time, intermediate point time and terminal point time of a velocity trajectory to be generated, wherein the velocity trajectory comprises a first velocity sub-trajectory and a second velocity sub-trajectory;

a first velocity sub-trajectory generation module configured to generate multiple first velocity sub-trajectory corresponding to a starting point velocity between the starting point time and the intermediate point time, according to the starting point velocity and multiple intermediate point velocities; and a second velocity sub-trajectory generation module configured to generate, for each of the first velocity sub-trajectories, multiple second velocity sub-trajectories between the intermediate point time and the terminal point time according to multiple terminal point velocities.

In an implementation, the apparatus in the embodiment of the application further includes:

an intermediate point velocity generation module configured to generate the multiple intermediate point velocities, according to the starting point velocity, a time difference between the starting point time and the intermediate point time, and an acceleration threshold.

In an implementation, the intermediate point velocity generation module includes:

a first determination submodule configured to determine a maximum of the intermediate point velocity according to the starting point velocity and a maximum of the acceleration threshold;

a second determination submodule configured to determine a minimum of the intermediate point velocity according to the starting point velocity and a minimum of the acceleration threshold; and a third determination submodule configured to determine multiple intermediate point velocities between the maximum of the intermediate point velocity and the minimum of the intermediate point velocity at a preset sampling velocity interval.

In an implementation, the first velocity sub-trajectory generation module includes:

a first generation submodule configured to generate an Mth-order polynomial function of velocity and time, M being a positive integer greater than 1;

a second generation submodule configured to generate multiple sampling points between the starting point time and the intermediate point time at a preset sampling time interval according to the Mth-order polynomial function; and a first fitting submodule configured to fit the multiple sampling points, to obtain a curve representing the first velocity sub-trajectory.

In an implementation, the first generation submodule includes:

a first determination unit configured to determine a coefficient of each order of the Mth-order polynomial function according to the starting point time, the starting point velocity, a starting point acceleration, the intermediate point time, the intermediate point velocity, an intermediate point acceleration and an intermediate point acceleration jerk, wherein M is equal to 5.

In an implementation, the apparatus in the embodiment of the application further includes:

a terminal point velocity generation module configured to generate multiple terminal point velocities according to the intermediate point velocity, a time difference between the intermediate point time and the terminal point time, and an acceleration threshold.

In an implementation, the terminal point velocity generation module includes:

a fourth determination module configured to determine a maximum of the terminal point velocity according to the intermediate point velocity and a maximum of the acceleration threshold;

a fifth determination module configured to determine a minimum of the terminal point velocity according to the intermediate point velocity and a minimum of the acceleration threshold; and a sixth determination module configured to determine the multiple terminal point velocities between the maximum of the terminal point velocity and the minimum of the terminal point velocity at a preset sampling velocity interval.

In an implementation, the second velocity sub-trajectory generation module includes:

a third generation submodule configured to generate an Nth-order polynomial function of velocity and time, N being a positive integer greater than 1;

a fourth generation submodule configured to generate multiple sampling points between the intermediate point time and the terminal point time at a preset time interval according to the Nth-order polynomial function; and a second fitting submodule configured to fit the multiple sampling points, to obtain a curve representing the second velocity sub-trajectory.

In an implementation, the third generation submodule include:

a second determination unit configured to determine a coefficient of each order of the Nth-order polynomial function according to the intermediate point time, the intermediate point velocity, an intermediate point acceleration, the terminal point time, the terminal point velocity, a terminal point acceleration and a terminal point acceleration jerk, wherein N is equal to 5.

In a third aspect, a velocity trajectory generation apparatus is provided according to an embodiment of the application. The functions of the apparatus may be implemented by using hardware or by corresponding software executed by hardware. The hardware or software includes one or more modules corresponding to the functions described above.

In a possible embodiment, the apparatus structurally includes a processor and a storage, wherein the storage is configured to store a program which supports the apparatus in executing the above method. The processor is configured to execute the program stored in the storage. The apparatus may further include a communication interface through which the apparatus communicates with other devices or communication networks.

In a fourth aspect, a computer-readable storage medium for storing computer software instructions used for a velocity trajectory generation apparatus is provided. The computer readable storage medium may include programs involved in executing of the method described above.

According to the above technical solutions, a velocity trajectory which is more in line with a human driving characteristic may be generated, the comfort level of a passenger may be improved, and an algorithm may be simplified.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

Figure 1:
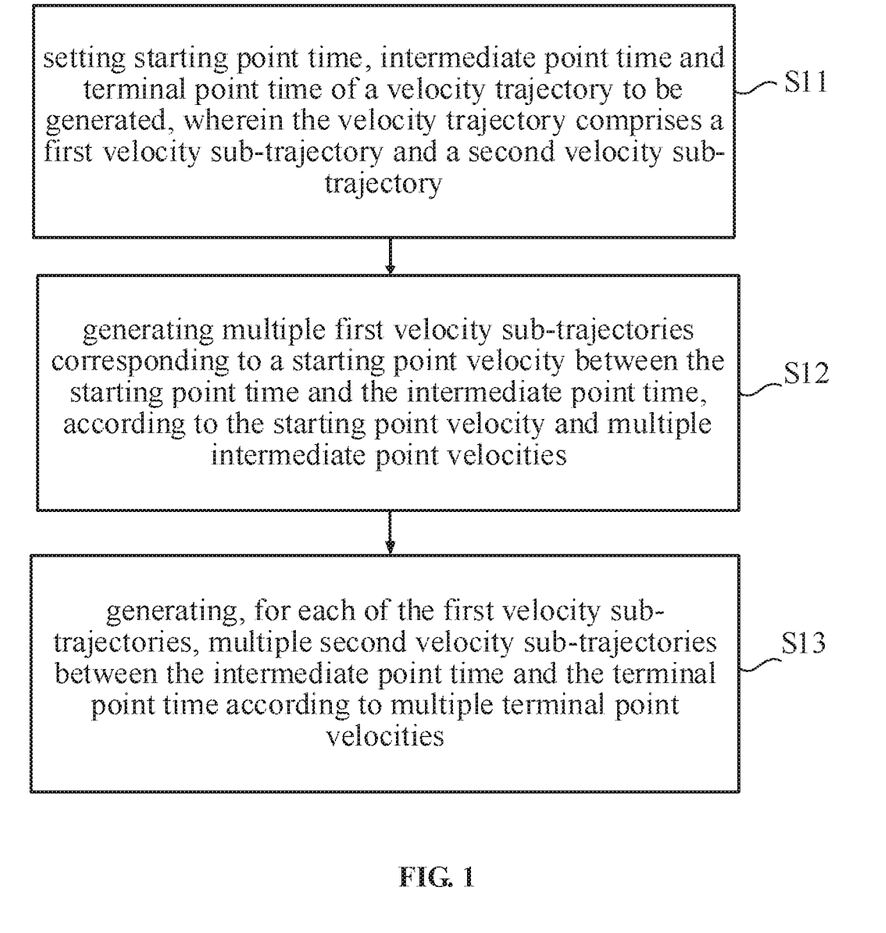
FIG. 1 is a flowchart showing a velocity trajectory generation method according to an embodiment of the application.

FIG. 1 is a flowchart showing a velocity trajectory generation method according to an embodiment of the application. As shown in FIG. 1, the method may include the following steps.

At S11, starting point time, intermediate point time and terminal point time of a velocity trajectory to be generated are set, wherein the velocity trajectory includes a first velocity sub-trajectory and a second velocity sub-trajectory.

At S12, multiple first velocity sub-trajectories corresponding to a starting point velocity are generated between the starting point time and the intermediate point time, according to the starting point velocity and multiple intermediate point velocities.

At S13, for each of the first velocity sub-trajectories, multiple second velocity sub-trajectories are generated between the intermediate point time and the terminal point time according to multiple terminal point velocities.

In a running process of a driverless vehicle, it is necessary to plan a driving trajectory for it. For example, a path trajectory and a velocity trajectory are planned. The planning of a path trajectory may include a determination of a route for a driverless vehicle from a starting position to a terminal position. The planning of a velocity trajectory may include a determination of a velocity of the driverless vehicle running along a selected path trajectory.

In above embodiment, the generation of a velocity trajectory may include generating a first velocity sub-trajectory between a starting point time t0 and an intermediate point time t1; and generating a second velocity sub-trajectory between the intermediate point time t1 and a terminal point time t2.

Figure 2:
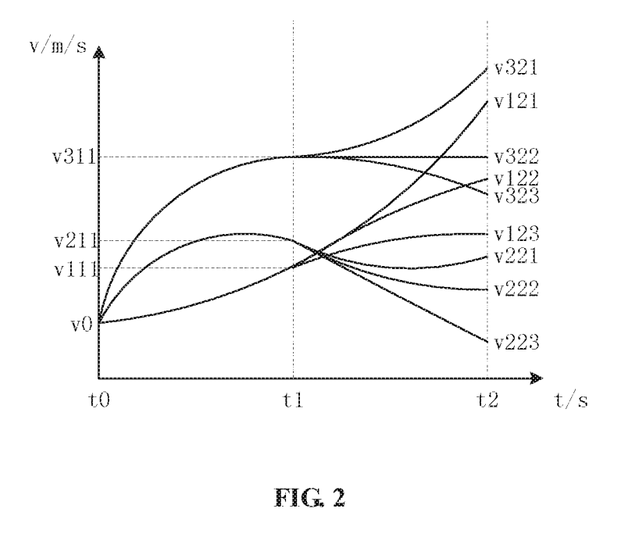
FIG. 2 is a diagram showing an application example of a velocity trajectory generation method according to an embodiment of the application.

As shown in FIG. 2, in an example, a velocity trajectory may include a one-dimensional velocity(v)-time(t) curve. Each of the generated velocity trajectories may include three key points: a starting point, an intermediate point and a terminal point. The starting point may correspond to starting point time, a starting point velocity, a starting point acceleration and a starting point acceleration jerk. The intermediate point may correspond to intermediate point time, an intermediate point velocity, an intermediate point acceleration and an intermediate point acceleration jerk. Accordingly, the terminal point may correspond to terminal point time, a terminal point velocity, a terminal point acceleration and a terminal point acceleration jerk. A first-order derivative of an acceleration may be referred to as an acceleration jerk.

In the example, the starting point may be represented by (starting point time, a starting point velocity), the intermediate point may be represented by (intermediate point time, an intermediate point velocity), and the terminal point may be represented by (terminal point time, a terminal point velocity). Then, a first velocity sub-trajectory may include a curve obtained by connecting a starting point and an intermediate point, and a second velocity sub-trajectory may include a curve obtained by connecting an intermediate point and a terminal point. A velocity trajectory may be represented by a corresponding starting point velocity and a corresponding terminal point velocity. Accordingly, a first velocity sub-trajectory may be represented by a corresponding starting point velocity and a corresponding intermediate point velocity, and a second velocity sub-trajectory may be represented by a corresponding intermediate point velocity and a corresponding terminal point velocity.

For example, a first velocity sub-trajectory (v0, v111) may be generated according to an intermediate point velocity v111, and a second velocity sub-trajectory (v111, v121) may be generated according to a terminal point velocity v121 corresponding to the first velocity sub-trajectory (v0, v111), thereby obtaining a velocity trajectory (v0, v121).

As shown in FIG. 2, in an example, the intermediate point velocity corresponding to the intermediate point time t1 may include one or more velocities, for example, v111, v211 and v311. Then, multiple intermediate points (v111, t1), (v211, t1) and (v311, t1) may be determined accordingly. By connecting the starting point and one of the intermediate points, a first velocity sub-trajectory may be generated. In this way, a plurality of first velocity sub-trajectories (v0, v111), (v0, v211) and (v0, v311) may be generated. The intermediate point acceleration jerk corresponding to each of the intermediate point velocities may be set to 0 m/s$^2$.

Each of the first velocity sub-trajectories may correspond to multiple terminal point velocities. Thus, a plurality of second velocity sub-trajectories may be generated accordingly.

For example, the first velocity sub-trajectory (v0, v111) may correspond to multiple terminal point velocities v121, v122 and v123. Thus, a plurality of second velocity sub-trajectories (v111, v121), (v111, v122) and (v111, v123) may be generated accordingly.

For another example, the first velocity sub-trajectory (v0, v211) may correspond to multiple terminal point velocities v221, v222 and v223. Thus, a plurality of second velocity sub-trajectories (v211, v221), (v211, v222) and (v211, v223) may be generated accordingly.

For yet another example, the first velocity sub-trajectory (v0, v311) may correspond to multiple terminal point velocities v321, v322 and v323. Thus, a plurality of second velocity sub-trajectories (v311, v321), (v311, v322) and (v311, v323) may be generated accordingly.

The terminal point acceleration jerk corresponding to each terminal point velocity may be set to 0 m/s$^2$.

In an implementation, a current velocity of a driverless vehicle and current time may be obtained, and the current velocity of the driverless vehicle and the current time may be determined as the starting point velocity v0 and the starting point time to, to plan a velocity trajectory in a subsequent time interval Δt (Δt=t2−t0). For example, Δt may be equal to 8 s. Under a normal condition, the driving velocity of a driverless vehicle is about 15 m/s and the braking time is about 7.5s. In addition, planning a velocity trajectory with a driving time period more than 8 s may usually result in large errors. Therefore, a velocity trajectory with a driving time period less than 8 s may be planned, to reduce data redundancy and improve planning accuracy.

Note that in above embodiment, a value of the intermediate point time is not limited. For example, t1 may be equal to Δt/2, or may be less than or more than Δt/2.

Figure 3:
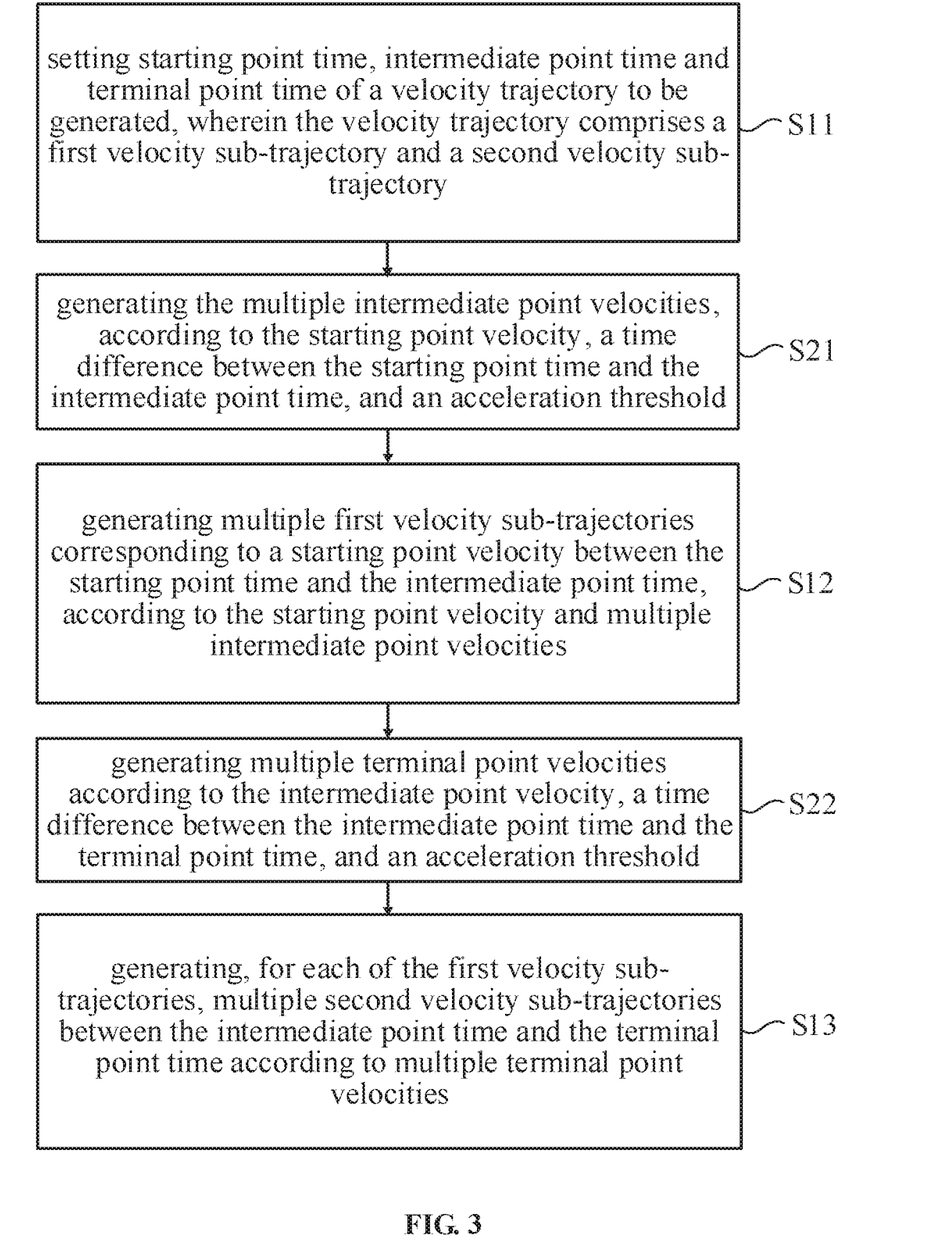
FIG. 3 is a flowchart showing a velocity trajectory generation method according to an implementation of an embodiment of the application.

As shown in FIG. 3, in an implementation, the velocity trajectory generation method may further include the following step.

At S21, the multiple intermediate point velocities are generated according to the starting point velocity, a time difference between the starting point time and the intermediate point time, and an acceleration threshold.

When a velocity trajectory is planned, the threshold of the acceleration a of a driverless vehicle may be considered according to different dynamic performances of different driverless vehicles. The threshold of the acceleration a may include an upper threshold $a_{max}$ of the acceleration and a lower threshold $a_{min}$ of the acceleration. For example, $a_{max}$=2 m/s$^2$ and $a_{min}$=−4 m/s$^2$, namely −4 m/s$^2$≤a≤2 m/s$^2$.

Under the condition that the acceleration of a driverless vehicle is between the upper threshold $a_{max}$ and the lower threshold $a_{min}$ of an acceleration, multiple intermediate point velocities v1 may be calculated according to a starting point velocity v0 and the time difference Δt1 between starting point time t0 and intermediate point time t1.

In an implementation, S21 may include:

(1) determining a maximum of the intermediate point velocity according to the starting point velocity and a maximum of the acceleration threshold;

(2) determining a minimum of the intermediate point velocity according to the starting point velocity and a minimum of the acceleration threshold; and (3) determining multiple intermediate point velocities between the maximum of the intermediate point velocity and the minimum of the intermediate point velocity at a preset sampling velocity interval.

For example, v0=12 m/s and Δt1=t1−t0=4 s. The maximum $v1_{max}$ of the intermediate point velocity and the minimum $v1_{min}$ of the intermediate point velocity may be determined according to $a_{max}$=2 m/s$^2$ and $a_{min}$=−4 m/s$^2$. That is, $v1_{max}$=v0+$a_{max}$×Δt1=0 m/s and $v1_{min}$=v0+$a_{min}$×Δt1=0 m/s (adopting the value of v1 as 0 m/s, when v1 is less than 0 m/s). Then, the value of the intermediate point velocity v1 may meet the condition of: 0 m/s≤v1≤20 m/s.

A sampling velocity interval may be preset, for example, as 0.5 m/s. The plurality of intermediate point velocities between the maximum $v1_{max}$ of the intermediate point velocity and the minimum $v1_{min}$ of the intermediate point velocity are determined at the preset sampling velocity interval. For example, the determined intermediate point velocities may be 20 m/s, 19.5 m/s, 19 m/s, 18.5 m/s, 18 m/s, . . . , 1 m/s, 0.5 m/s and 0 m/s. A first velocity sub-trajectory may be generated based on each intermediate point velocity.

As shown in FIG. 3, in an implementation, the method in the embodiment of the application may further include the following step.

At S22, multiple terminal point velocities are generated according to the intermediate point velocity, a time difference between the intermediate point time and the terminal point time, and an acceleration threshold.

For example, under the condition that the acceleration of a driverless vehicle is between an upper threshold $a_{max}$ and a lower threshold $a_{min}$ of an acceleration, multiple terminal point velocities v2 may be calculated according to an intermediate point velocity v1 and the time difference Δt2 of intermediate point time t1 and terminal point time t2. A terminal point velocity may be calculated by using each intermediate point velocity v1. If there are N intermediate point velocities v1, N terminal point velocities v2 may be calculated.

In an implementation, S22 may include:

(1) determining a maximum of the terminal point velocity according to the intermediate point velocity and a maximum of the acceleration threshold;

(2) determining a minimum of the terminal point velocity according to the intermediate point velocity and a minimum of the acceleration threshold; and (3) determining the multiple terminal point velocities between the maximum of the terminal point velocity and the minimum of the terminal point velocity at a preset sampling velocity interval.

For example, v111=1.7 m/s and Δt2=t2−t1=4 s. The maximum $v2_{max}$ of the terminal point velocity and the minimum $v2_{min}$ of the terminal point velocity may be determined according to $a_{max}$=2 m/s$^2$ and $a_{min}$=−4 m/s$^2$. That is, $v2_{max}$=v111+$a_{max}$×Δt2=25 m/s and $v2_{min}$=v111+$a_{min}$×Δt2=1 m/s. Then, the value of the terminal point velocity v2 may meet the condition of: 1 m/s$^2$≤v2≤25 m/s.

The plurality of terminal point velocities between the maximum $v2_{max}$ of the terminal point velocity and the minimum $v2_{min}$ of the terminal point velocity are determined at the preset sampling velocity interval such as 0.5 m/s. For example, the determined terminal point velocities may be 25 m/s, 24.5 m/s, 24 m/s, . . . , 1.5 m/s and 1 m/s. A second velocity sub-trajectory may be generated based on each terminal point velocity.

In an implementation, the method in above embodiment of the application may further include: determining the intermediate point velocity and the terminal point velocity according to a velocity limit condition in a traffic rule. For example, according to a planned path trajectory between starting point time and terminal point time, a traffic rule associated with the path trajectory may be obtained. If the obtained traffic rule includes a velocity limit condition, both the intermediate point velocity and the terminal point velocity are required to meet the velocity limit condition.

In an example, an acceleration and an acceleration jerk of the first velocity sub-trajectory may be continuously changed, and an acceleration and an acceleration jerk of the second velocity sub-trajectory may be continuously changed. Specific implementation manners are not limited in embodiments of the application. For example, a starting point may be connected with an intermediate point by using a smooth curve, to generate a first velocity sub-trajectory, wherein the acceleration and the acceleration jerk of the first velocity sub-trajectory are continuously changed; and similarly, an intermediate point may be connected with a terminal point by using a smooth curve, to generate a second velocity sub-trajectory, wherein the acceleration and acceleration jerk of the second velocity sub-trajectory are continuously changed.

Figure 4:
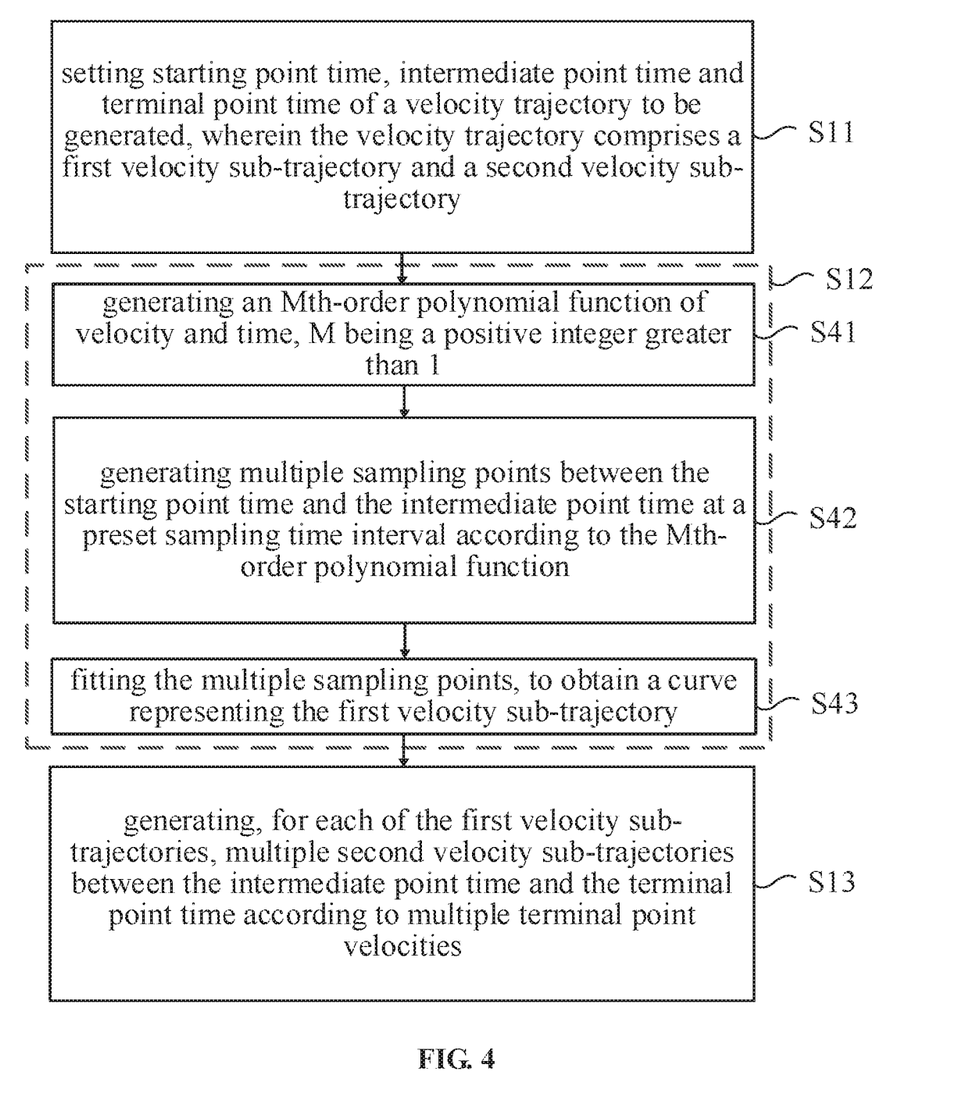
FIG. 4 is a flowchart showing a velocity trajectory generation method according to another implementation of an embodiment of the application.

As shown in FIG. 4, in an implementation, S12 may include the following steps.

At S41, an Mth-order polynomial function of velocity and time is generated, M being a positive integer greater than 1.

At S42, multiple sampling points are generated between the starting point time and the intermediate point time at a preset sampling time interval, according to the Mth-order polynomial function.

At S43, the multiple sampling points are fitted, to obtain a curve representing the first velocity sub-trajectory.

For example, a fifth-order polynomial function $v1(t) = x11 + x12 \times t + x13 \times t^2 + x14 \times t^3 + x15 \times t^4$ is generated, where $x11$, $x12$, $x13$, $x14$ and $x15$ are coefficients. Values of $x11$, $x12$, $x13$, $x14$ and $x15$ of the fifth-order polynomial function $v1(t)$ may be determined according to starting point time, starting point velocities, starting point accelerations, intermediate point time, intermediate point velocities, intermediate point accelerations and intermediate point acceleration jerks. The starting point acceleration of a driverless vehicle may be determined according to a current acceleration of the driverless vehicle, and each intermediate point acceleration jerk may be set to 0 m/s².

In addition, a sampling time interval may be preset, for example, as 1s. Then, the plurality of first sampling points may be determined according to the fifth-order polynomial function $v1(t)$. The first sampling point is associated with first sampling time (for example, 1 s, 2 s and 3s) between the starting point time and the intermediate point time, and velocities at the first sampling time (for example, velocities at 1 s, 2 s and 3 s). The starting point, the plurality of first sampling points and the intermediate point may be fitted, to generate a first velocity sub-trajectory.

Figure 5:
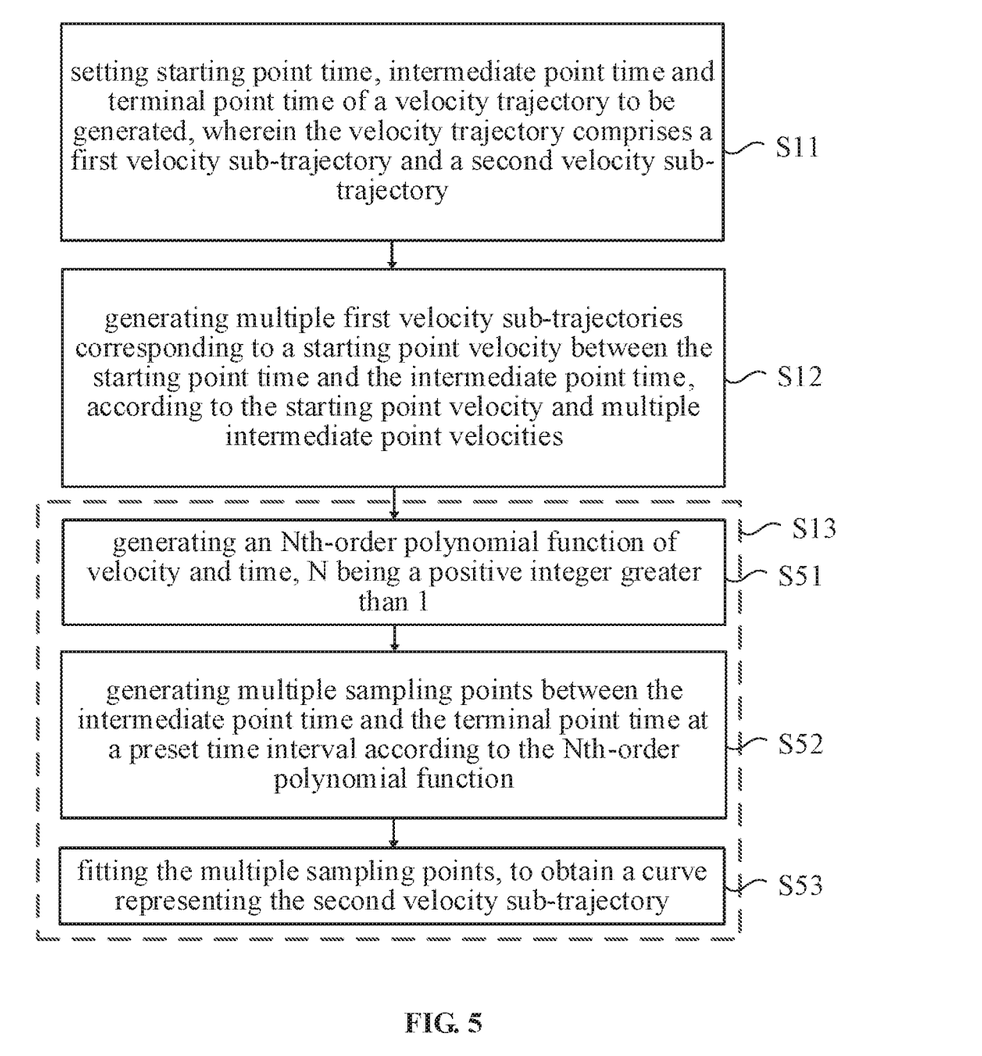
FIG. 5 is a flowchart showing a velocity trajectory generation method according to yet another implementation of an embodiment of the application.

As shown in FIG. 5, in an implementation, S13 may include the following steps.

At S51, an Nth-order polynomial function of velocity and time is generated, N being a positive integer greater than 1.

At S52, multiple sampling points are generated between the intermediate point time and the terminal point time at a preset time interval, according to the Nth-order polynomial function.

At S53, the multiple sampling points are fitted, to obtain a curve representing the second velocity sub-trajectory.

For example, a fifth-order polynomial function $v2(t) = x21 + x22 \times t + x23 \times t^2 + x24 \times t^3 + x25 \times t^4$ is generated, where $x21$, $x22$, $x23$, $x24$ and $x25$ are coefficients. Values of $x21$, $x22$, $x23$, $x24$ and $x25$ of the fifth-order polynomial function $v2(t)$ may be determined according to intermediate point time, intermediate point velocities, intermediate point accelerations, terminal point time, terminal point velocities, terminal point accelerations and terminal point acceleration jerks. Each terminal point acceleration jerk may be set to 0 m/s².

Then, a plurality of second sampling points may be determined at a preset sampling time interval, according to the fifth-order polynomial function $v2(t)$. The second sampling point is associated with second sampling time (for example, 5 s, 6 s and 7 s) between the intermediate point time and the terminal point time, and velocities at the second sampling time (for example, velocities at 5 s, 6 s and 7 s). The intermediate point, the plurality of second sampling points and the terminal point may be fitted, to generate a second velocity sub-trajectory.

In a driving process, an acceleration or a deceleration operation may not usually be performed frequently by a driver. According to the velocity trajectory generation method in above embodiment, a velocity trajectory may be generated by means of a two-stage sampling method. The generated velocity trajectory includes a first velocity sub-trajectory and a second velocity sub-trajectory, wherein the accelerations and the acceleration jerks of the first velocity sub-trajectory and of the second velocity sub-trajectory are continuously changed. Therefore, according to the velocity trajectory generation method in above embodiment, a velocity trajectory which is more in line with a human driving characteristic may be generated, data redundancy may be reduced, and an algorithm may be simplified. In addition, an acceleration jerk is related to a stress on a passenger in a driverless vehicle, namely an acceleration jerk may affect the comfort level of a passenger in a driverless vehicle. According to the velocity trajectory generation method in above embodiment of the application, a first velocity sub-trajectory and a second velocity sub-trajectory are generated, wherein the accelerations and the acceleration jerks of the first velocity sub-trajectory and of the second velocity sub-trajectory are continuously changed, so that higher driving stability may be ensured, and the comfort level of a passenger may be improved. Furthermore, when a velocity trajectory is generated, an acceleration limit of a driverless vehicle is taken into account, so that the data redundancy may be reduced, and a calculated amount of a subsequent optimum selection algorithm for selecting an optimal velocity trajectory from multiple velocity trajectories may be reduced.

Figure 6:
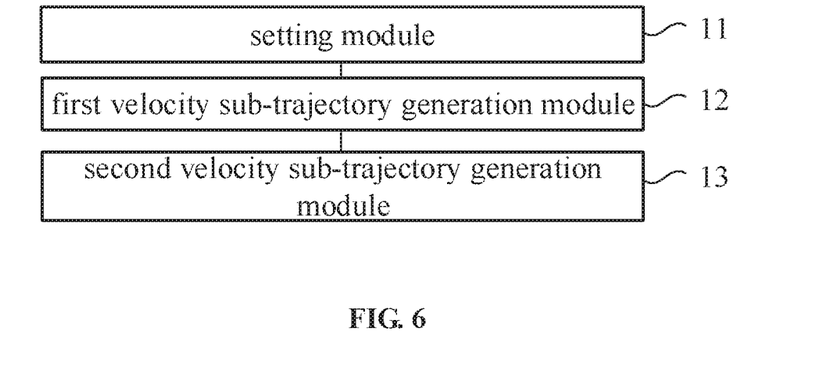
FIG. 6 is a structural block diagram showing a velocity trajectory generation apparatus according to an embodiment of the application.

FIG. 6 is a structure block diagram showing a velocity trajectory generation apparatus according to an embodiment of the application. As shown in FIG. 6, the apparatus may include:

a setting module 11 configured to set starting point time, intermediate point time and terminal point time of a velocity trajectory to be generated, wherein the velocity trajectory comprises a first velocity sub-trajectory and a second velocity sub-trajectory;

a first velocity sub-trajectory generation module 12 configured to generate multiple first velocity sub-trajectory corresponding to a starting point velocity between the starting point time and the intermediate point time, according to the starting point velocity and multiple intermediate point velocities; and a second velocity sub-trajectory generation module 13 configured to generate, for each of the first velocity sub-trajectories, multiple second velocity sub-trajectories between the intermediate point time and the terminal point time according to multiple terminal point velocities.

Figure 7:
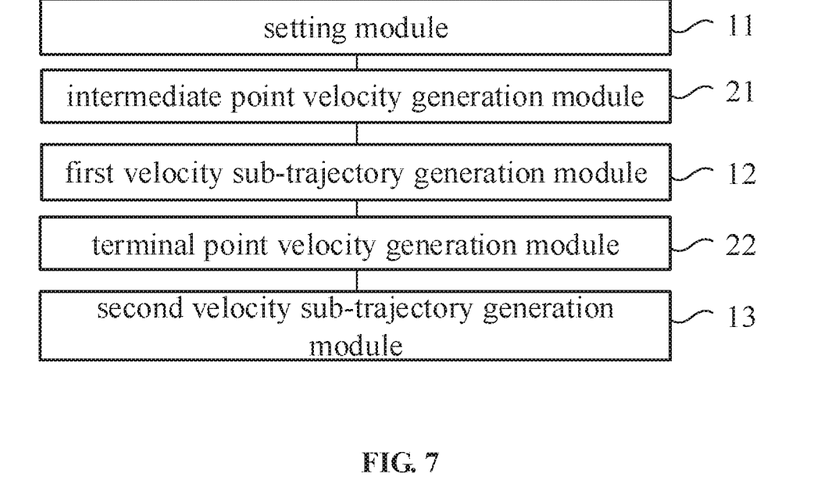
FIG. 7 is a structural block diagram showing a velocity trajectory generation apparatus according to an implementation of an embodiment of the application.

As shown in FIG. 7, in an implementation, the apparatus in the embodiment of the application may further include:

an intermediate point velocity generation module 21 configured to generate the multiple intermediate point velocities, according to the starting point velocity, a time difference between the starting point time and the intermediate point time, and an acceleration threshold.

Figure 8:
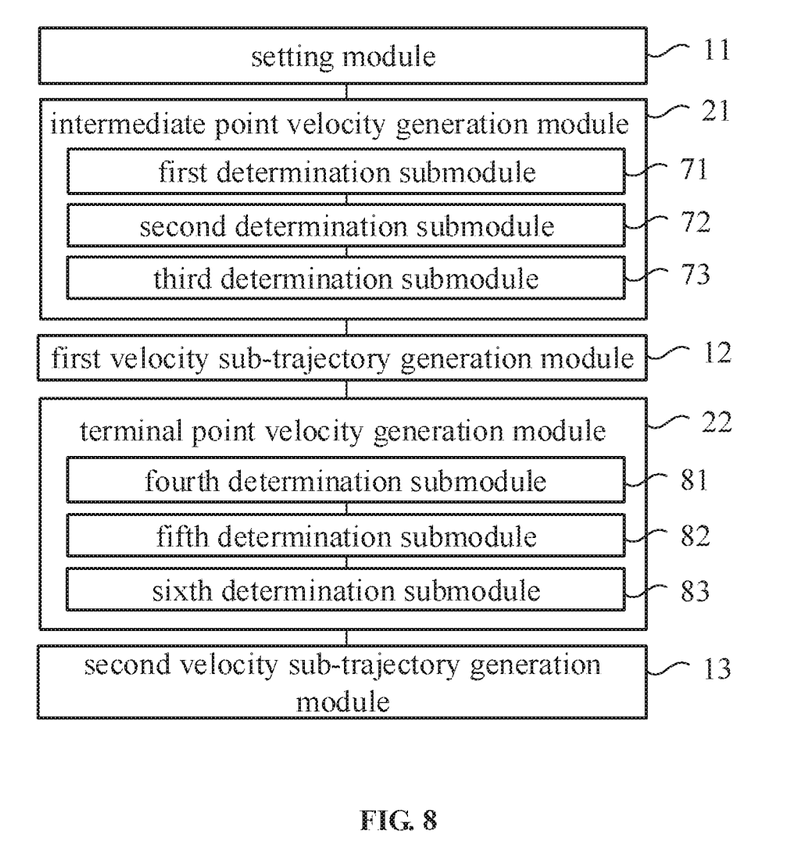
FIG. 8 is a structural block diagram showing a velocity trajectory generation apparatus according to another implementation of an embodiment of the application.

As shown in FIG. 8, in an implementation, the intermediate point velocity generation module 21 may include:

a first determination submodule 71 configured to determine a maximum of the intermediate point velocity according to the starting point velocity and a maximum of the acceleration threshold;

a second determination submodule 72 configured to determine a minimum of the intermediate point velocity according to the starting point velocity and a minimum of the acceleration threshold; and a third determination submodule 73 configured to determine multiple intermediate point velocities between the maximum of the intermediate point velocity and the minimum of the intermediate point velocity at a preset sampling velocity interval.

Figure 9:
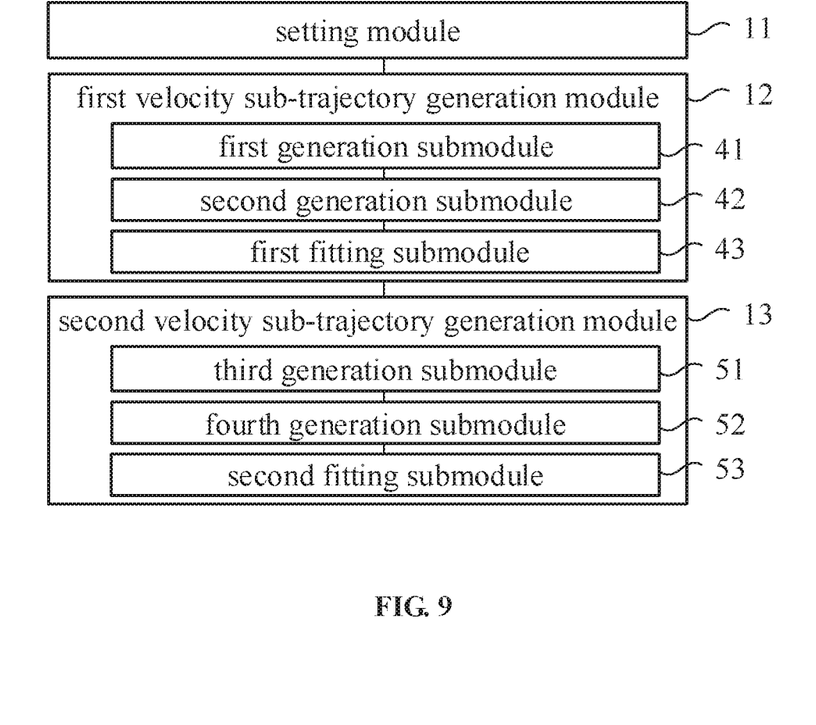
FIG. 9 is a structural block diagram showing a velocity trajectory generation apparatus according to yet another implementation of an embodiment of the application.

As shown in FIG. 9, in an implementation, the first velocity sub-trajectory generation module 12 may include:

a first generation submodule 41 configured to generate an Mth-order polynomial function of velocity and time, M being a positive integer greater than 1;

a second generation submodule 42 configured to generate multiple sampling points between the starting point time and the intermediate point time at a preset sampling time interval according to the Mth-order polynomial function; and a first fitting submodule 43 configured to fit the multiple sampling points, to obtain a curve representing the first velocity sub-trajectory.

In an implementation, the first generation submodule 41 may include:

a first determination unit configured to determine a coefficient of each order of the Mth-order polynomial function according to the starting point time, the starting point velocity, a starting point acceleration, the intermediate point time, the intermediate point velocity, an intermediate point acceleration and an intermediate point acceleration jerk, wherein M is equal to 5.

As shown in FIG. 7, in an implementation, the apparatus in the embodiment of the application may further include:

a terminal point velocity generation module 22 configured to generate multiple terminal point velocities according to the intermediate point velocity, a time difference between the intermediate point time and the terminal point time, and an acceleration threshold.

As shown in FIG. 8, in an implementation, the terminal point velocity generation module 22 may include:

a fourth determination submodule 81 configured to determine a maximum of the terminal point velocity according to the intermediate point velocity and a maximum of the acceleration threshold;

a fifth determination submodule 82 configured to determine a minimum of the terminal point velocity according to the intermediate point velocity and a minimum of the acceleration threshold; and a sixth determination submodule 83 configured to determine the multiple terminal point velocities between the maximum of the terminal point velocity and the minimum of the terminal point velocity at a preset sampling velocity interval.

As shown in FIG. 9, in an implementation, the second velocity sub-trajectory generation module 13 may include:

a third generation submodule 51 configured to generate an Nth-order polynomial function of velocity and time, N being a positive integer greater than 1;

a fourth generation submodule 52 configured to generate multiple sampling points between the intermediate point time and the terminal point time at a preset time interval according to the Nth-order polynomial function; and a second fitting submodule 53 configured to fit the multiple sampling points, to obtain a curve representing the second velocity sub-trajectory.

In an implementation, the third generation submodule 51 may include:

a second determination unit configured to determine a coefficient of each order of the Nth-order polynomial function according to the intermediate point time, the intermediate point velocity, an intermediate point acceleration, the terminal point time, the terminal point velocity, a terminal point acceleration and a terminal point acceleration jerk, wherein N is equal to 5.

In an implementation, an acceleration and an acceleration jerk of each of the first velocity sub-trajectories are continuously changed, an acceleration and an acceleration jerk of each of the second velocity sub-trajectories are continuously changed, and the intermediate point acceleration jerks and the terminal point acceleration jerks are 0.

In the embodiment of the application, functions of modules in the apparatus refer to the corresponding description of the method mentioned above and thus a detailed description thereof is omitted herein.

Figure 10:
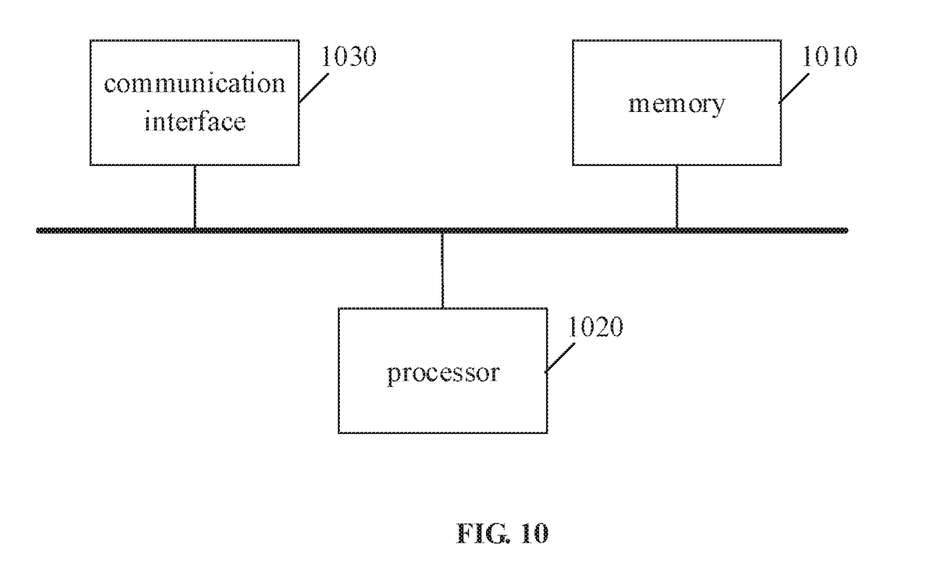
FIG. 10 is a structural block diagram showing a velocity trajectory generation apparatus according to an embodiment of the application.

FIG. 10 is a structure block diagram showing a velocity trajectory generation apparatus according to an embodiment of the application. As shown in FIG. 10, the apparatus includes a memory 1010 and a processor 1020, wherein a computer program that can run on the processor 1020 is stored in the memory 1010. The processor 1020 executes the computer program to implement the velocity trajectory generation method in the abovementioned embodiment. The number of either the memory 1010 or the processor 1020 may be one or more.

The apparatus further includes:

a communication interface 1030 configured to communicate with an external device and exchange data.

The memory 1010 may include a high-speed RAM memory and may also include a non-volatile memory, such as at least one magnetic disk memory.

If the memory 1010, the processor 1020 and the communication interface 1030 are implemented independently, the memory 1010, the processor 1020 and the communication interface 1030 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 10 to represent the bus, but it does not mean that there is only one bus or one type of bus.

Optionally, in a specific implementation, if the memory 1010, the processor 1020 and the communication interface 1030 are integrated on one chip, the memory 1010, the processor 1020 and the communication interface 1030 may implement mutual communication through an internal interface.

According to an embodiment of the application, it is provided a computer-readable storage medium having computer programs stored thereon. When executed by a processor, the programs implement the method described in the above embodiment.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A velocity trajectory generation method, comprising:
    setting starting point time, intermediate point time and terminal point time of a velocity trajectory to be generated, wherein the velocity trajectory comprises a velocity of a vehicle running along a path trajectory; wherein the velocity trajectory comprises a first velocity sub-trajectory and a second velocity sub-trajectory;
    generating multiple first velocity sub-trajectories corresponding to a starting point velocity between the starting point time and the intermediate point time, according to the starting point velocity and multiple intermediate point velocities; and
    generating, for each of the first velocity sub-trajectories, multiple second velocity sub-trajectories between the intermediate point time and the terminal point time according to multiple terminal point velocities;
    wherein an acceleration and an acceleration jerk of each of the first velocity sub-trajectories and an acceleration and an acceleration jerk of each of the second velocity sub-trajectories are continuously changed; and intermediate point acceleration jerks and terminal point acceleration jerks are 0.

2. The velocity trajectory generation method according to claim 1, further comprising:
generating the multiple intermediate point velocities, according to the starting point velocity, a time difference between the starting point time and the intermediate point time, and an acceleration threshold.

3. The velocity trajectory generation method according to claim 2, wherein the generating the multiple intermediate point velocities, according to the starting point velocity, a time difference between the starting point time and the intermediate point time, and an acceleration threshold comprises:
determining a maximum of the intermediate point velocity according to the starting point velocity and a maximum of the acceleration threshold;
determining a minimum of the intermediate point velocity according to the starting point velocity and a minimum of the acceleration threshold; and
determining multiple intermediate point velocities between the maximum of the intermediate point velocity and the minimum of the intermediate point velocity at a preset sampling velocity interval.

4. The velocity trajectory generation method according to claim 1, wherein the generating the first velocity sub-trajectory comprises:
generating an Mth-order polynomial function of velocity and time, M being a positive integer greater than 1;
generating multiple sampling points between the starting point time and the intermediate point time at a preset sampling time interval according to the Mth-order polynomial function; and
fitting the multiple sampling points, to obtain a curve representing the first velocity sub-trajectory.

5. The velocity trajectory generation method according to claim 4, wherein the generating an Mth-order polynomial function of velocity and time comprises:
determining a coefficient of each order of the Mth-order polynomial function according to the starting point time, the starting point velocity, a starting point acceleration, the intermediate point time, the intermediate point velocity, an intermediate point acceleration and an intermediate point acceleration jerk, wherein M is equal to 5.

6. The velocity trajectory generation method according to claim 1, further comprising:
generating multiple terminal point velocities according to the intermediate point velocity, a time difference between the intermediate point time and the terminal point time, and an acceleration threshold.

7. The velocity trajectory generation method according to claim 6, wherein the generating multiple terminal point velocities according to a time difference between the intermediate point time and the terminal point time, and an acceleration threshold comprises:
determining a maximum of the terminal point velocity according to the intermediate point velocity and a maximum of the acceleration threshold;
determining a minimum of the terminal point velocity according to the intermediate point velocity and a minimum of the acceleration threshold; and
determining the multiple terminal point velocities between the maximum of the terminal point velocity and the minimum of the terminal point velocity at a preset sampling velocity interval.

8. The velocity trajectory generation method according to claim 1, wherein the generating the second sub velocity trajectory comprises:
generating an Nth-order polynomial function of velocity and time, N being a positive integer greater than 1;
generating multiple sampling points between the intermediate point time and the terminal point time at a preset time interval according to the Nth-order polynomial function; and
fitting the multiple sampling points, to obtain a curve representing the second velocity sub-trajectory.

9. The velocity trajectory generation method according to claim 8, wherein the generating an Nth-order polynomial function of velocity and time comprises:
determining a coefficient of each order of the Nth-order polynomial function according to the intermediate point time, the intermediate point velocity, an intermediate point acceleration, the terminal point time, the terminal point velocity, a terminal point acceleration and a terminal point acceleration jerk, wherein N is equal to 5.

10. A velocity trajectory generation apparatus, comprising:
one or more processors; and
a storage device configured to store one or more programs, wherein
the one or more programs, when executed by the one or more processors, cause the one or more processors to:
set starting point time, intermediate point time and terminal point time of a velocity trajectory to be generated, wherein the velocity trajectory comprises a velocity of a vehicle running along a path trajectory; wherein the velocity trajectory comprises a first velocity sub-trajectory and a second velocity sub-trajectory;
configured to generate multiple first velocity sub-trajectory corresponding to a starting point velocity between the starting point time and the intermediate point time, according to the starting point velocity and multiple intermediate point velocities; and
configured to generate, for each of the first velocity sub-trajectories, multiple second velocity sub-trajectories between the intermediate point time and the terminal point time according to multiple terminal point velocities;
wherein an acceleration and an acceleration jerk of each of the first velocity sub-trajectories and an acceleration and an acceleration jerk of each of the second velocity sub-trajectories are continuously changed; and intermediate point acceleration jerks and terminal point acceleration jerks are 0.

11. The velocity trajectory generation apparatus according to claim 10, wherein the one or more programs, when executed by the one or more processors, cause the one or more processors further to:
generate the multiple intermediate point velocities, according to the starting point velocity, a time difference between the starting point time and the intermediate point time, and an acceleration threshold.

12. The velocity trajectory generation apparatus according to claim 11, wherein the one or more programs, when executed by the one or more processors, cause the one or more processors further to:
determine a maximum of the intermediate point velocity according to the starting point velocity and a maximum of the acceleration threshold;

determine a minimum of the intermediate point velocity according to the starting point velocity and a minimum of the acceleration threshold; and determine multiple intermediate point velocities between the maximum of the intermediate point velocity and the minimum of the intermediate point velocity at a preset sampling velocity interval.

13. The velocity trajectory generation apparatus according to claim 10, wherein the one or more programs, when executed by the one or more processors, cause the one or more processors further to:

generate an Mth-order polynomial function of velocity and time, M being a positive integer greater than 1;

generate multiple sampling points between the starting point time and the intermediate point time at a preset sampling time interval according to the Mth-order polynomial function; and fit the multiple sampling points, to obtain a curve representing the first velocity sub-trajectory.

14. The velocity trajectory generation apparatus according to claim 13, wherein the one or more programs, when executed by the one or more processors, cause the one or more processors further to:

determine a coefficient of each order of the Mth-order polynomial function according to the starting point time, the starting point velocity, a starting point acceleration, the intermediate point time, the intermediate point velocity, an intermediate point acceleration and an intermediate point acceleration jerk, wherein M is equal to 5.

15. The velocity trajectory generation apparatus according to claim 10, wherein the one or more programs, when executed by the one or more processors, cause the one or more processors further to:

generate multiple terminal point velocities according to the intermediate point velocity, a time difference between the intermediate point time and the terminal point time, and an acceleration threshold.

16. The velocity trajectory generation apparatus according to claim 15, wherein the one or more programs, when executed by the one or more processors, cause the one or more processors further to:

determine a maximum of the terminal point velocity according to the intermediate point velocity and a maximum of the acceleration threshold;

determine a minimum of the terminal point velocity according to the intermediate point velocity and a minimum of the acceleration threshold; and determine the multiple terminal point velocities between the maximum of the terminal point velocity and the minimum of the terminal point velocity at a preset sampling velocity interval.

17. The velocity trajectory generation apparatus according to claim 10, wherein the one or more programs, when executed by the one or more processors, cause the one or more processors further to:

generate an Nth-order polynomial function of velocity and time, N being a positive integer greater than 1;

generate multiple sampling points between the intermediate point time and the terminal point time at a preset time interval according to the Nth-order polynomial function; and fit the multiple sampling points, to obtain a curve representing the second velocity sub-trajectory.

18. The velocity trajectory generation apparatus according to claim 17, wherein the one or more programs, when executed by the one or more processors, cause the one or more processors further to:

determine a coefficient of each order of the Nth-order polynomial function according to the intermediate point time, the intermediate point velocity, an intermediate point acceleration, the terminal point time, the terminal point velocity, a terminal point acceleration and a terminal point acceleration jerk, wherein N is equal to 5.

19. A non-transitory computer-readable storage medium comprising computer programs stored thereon, wherein the programs, when executed by a processor, cause the processor to:

set starting point time, intermediate point time and terminal point time of a velocity trajectory to be generated, wherein the velocity trajectory comprises a velocity of a vehicle running along a path trajectory; wherein the velocity trajectory comprises a first velocity sub-trajectory and a second velocity sub-trajectory;

generate multiple first velocity sub-trajectories corresponding to a starting point velocity between the starting point time and the intermediate point time, according to the starting point velocity and multiple intermediate point velocities; and generate, for each of the first velocity sub-trajectories, multiple second velocity sub-trajectories between the intermediate point time and the terminal point time according to multiple terminal point velocities;

wherein an acceleration and an acceleration jerk of each of the first velocity sub-trajectories and an acceleration and an acceleration jerk of each of the second velocity sub-trajectories are continuously changed; and intermediate point acceleration jerks and terminal point acceleration jerks are 0.

* * * * *